United States Patent
Schaum (10) Patent No.: US 6,868,962 B2
(45) Date of Patent: Mar. 22, 2005

(54) ADJUSTABLE CONNECTOR FOR NOSE-OVER AND INCLINE/DECLINE ASSEMBLY

(75) Inventor: Frank-Peter Schaum, Grand Rapids, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 19 days.

(21) Appl. No.: 10/694,070

(22) Filed: Oct. 27, 2003

(65) Prior Publication Data

US 2004/0089522 A1 May 13, 2004

Related U.S. Application Data

(60) Provisional application No. 60/421,678, filed on Oct. 28, 2002.

(51) Int. Cl.[7] ............................................. B65G 21/00
(52) U.S. Cl. ................................................ 198/861.2
(58) Field of Search ........................ 198/861.1, 861.2, 198/861.3, 861.4, 861.5

(56) References Cited

U.S. PATENT DOCUMENTS

| | | | | |
|---|---|---|---|---|
| 1,459,524 A | * | 6/1923 | Wright | 198/814 |
| 1,489,752 A | * | 4/1924 | Fraley | 198/861.5 |
| 2,690,834 A | * | 10/1954 | Lundquist | 198/861.2 |
| 3,067,858 A | * | 12/1962 | Loosli | 198/306 |
| 3,343,650 A | * | 9/1967 | Brown | 198/861.2 |
| 3,572,496 A | * | 3/1971 | Cutts et al. | 198/861.2 |
| 3,743,078 A | | 7/1973 | Pittoreau | 198/121 |
| 3,889,796 A | * | 6/1975 | Baily et al. | 198/301 |
| 4,098,396 A | * | 7/1978 | Stoppani et al. | 198/735.6 |
| 4,574,937 A | | 3/1986 | Anderson et al. | 198/321 |
| 4,730,716 A | * | 3/1988 | Enneking et al. | 198/304 |
| 4,759,437 A | | 7/1988 | Bevins | 198/632 |
| 4,872,542 A | * | 10/1989 | Enneking | 198/312 |
| 5,568,857 A | * | 10/1996 | Chen et al. | 198/592 |
| 5,667,054 A | | 9/1997 | Van Den Goor | 198/370.04 |
| 5,695,042 A | | 12/1997 | van der Burgt et al. | 198/600 |
| 5,826,704 A | | 10/1998 | Van Den Goor | 198/851 |
| 5,875,883 A | * | 3/1999 | Ertel et al. | 198/821 |
| 5,909,797 A | | 6/1999 | Van Den Goor | 198/370.02 |
| 5,924,551 A | | 7/1999 | Radmall | 198/861.1 |
| 6,296,109 B1 | * | 10/2001 | Nohl | 198/632 |
| 6,325,202 B1 | | 12/2001 | Gaines | 198/583 |
| 6,619,473 B2 | | 9/2003 | Romeo | 198/836.1 |

FOREIGN PATENT DOCUMENTS

| | | | |
|---|---|---|---|
| EP | 0731040 | 9/1996 | ........... B65G/21/00 |
| GB | 646190 | 11/1950 | |
| GB | 828449 | 2/1960 | |
| JP | 4168080 | 6/1992 | ........... B65G/21/00 |
| JP | 4280717 | 10/1992 | ........... B65G/21/14 |

* cited by examiner

Primary Examiner—Richard Ridley
(74) Attorney, Agent, or Firm—Van Dyke, Gardner, Linn & Burkhart, LLP (57) ABSTRACT

An adjustable assembly is configured to accommodate angular adjustment between adjacent belted conveyor sections. The adjustable assembly functions to position the belted conveyor sections so that one of the rollers of one belted conveyor section is aligned with the rollers of the other belted conveyor section in a direction of conveyance of the conveyor sections. The rollers are aligned such that an article on the belt of the upstream belted conveyor section does not substantially engage the aligned roller of the downstream belted conveyor section as the article is moved from the upstream belt onto the downstream belt. The adjustable assembly may provide a smooth transition between the conveyor sections throughout a range of angular adjustment of the adjustable assembly.

42 Claims, 8 Drawing Sheets

ADJUSTABLE CONNECTOR FOR NOSE-OVER AND INCLINE/DECLINE ASSEMBLY

CROSS REFERENCE TO RELATED APPLICATION

The present application claims priority of U.S. provisional application, Ser. No. 60/421,678, filed Oct. 28, 2002, which is hereby incorporated herein by reference in its entirety.

FIELD OF THE INVENTION

The present invention relates generally to conveyors and, more particularly, to a connector assembly for connecting adjacent conveyor sections of a conveyor, where the conveyor sections are angled at an incline or decline relative to one another.

BACKGROUND OF THE INVENTION

Typically, a powered belt conveyor includes conveyor sidewalls and cross members which are cut to a predetermined length or size and welded together to manufacture the desired belt conveyor. The sidewalls and cross members and other components are welded or otherwise secured together in the desired arrangement or layout for the particular application. In situations where a conveyor section is inclined or declined relative to another adjacent conveyor section, a weldment may be cut or formed to the appropriate angle and welded in place between the angled sections. The conveyor and conveyor sections thus are generally non-adjustable and difficult to modify should changes be required or desired in the layout of the conveyor.

Some conveyors have been proposed which bolt together to allow for changeover or modification of the conveyor. However, such conveyors are typically roller conveyors, because the belted conveyors cannot withstand the excessive forces exerted by a continuous conveyor belt which is driven around guide rollers of a belt conveyor during operation of the belt conveyors. Such excessive forces tend to cause slippage between the fasteners and components of the conveyors.

Furthermore, although some bolt together conveyors provide for adjustment of the conveyor layout, they still may require some specialized plates or components to adapt the conveyor to the appropriate layout. For example, when the angle between two adjacent conveyor sections changes, an appropriate nose-over plate must be made and installed at the joint between the two conveyor sections to provide a generally continuous conveying surface between the two conveyor sections.

Therefore, there is a need in the art for an adjustable connector for connecting adjacent sections of a conveyor together.

SUMMARY OF THE INVENTION

The present invention provides an adjustable connector assembly for connecting adjacent belted conveyor sections together, particularly at an incline or decline between the conveyor sections. The adjustable connector assembly of the present invention may be adjusted to align with or correspond to the particular incline or decline angle between the adjacent belted conveyor sections. The adjustable connector assembly mounts a roller for guiding or reversing a continuous belt around at least one of the belted conveyor sections.

According to an aspect of the present invention, a conveyor unit includes first and second belted conveyor sections having opposite sidewalls, at least one continuous conveyor belt and an adjustable assembly positioned between the first and second belted conveyor sections. The first belted conveyor section includes at least two first rollers and the second belted conveyor section includes at least one second roller. The conveyor unit has a direction of conveyance from the first belted conveyor section to the second belted conveyor section. The continuous conveyor belt defines at least one conveying surface and is reeved around at least some of the rollers. The adjustable assembly includes a guide roller that is positioned at and between the sides of the adjustable assembly and that defines a pivot axis therethrough. The adjustable assembly is configured to pivot about the pivot axis and to align the guide roller with the rollers of the belted conveyor sections throughout a range of pivotal adjustment of the adjustable assembly, such that an article on the first belted conveyor section does not substantially engage the guide roller of the adjustable assembly as the article is conveyed from the first belted conveyor section to the second belted conveyor section.

The range of pivotal adjustment may comprise a range between at least approximately five degrees of an incline of the second belted conveyor section relative to the first belted conveyor section and at least approximately five degrees of a decline of the second belted conveyor section relative to the first belted conveyor section.

Optionally, the first belted conveyor section may be positionable at a decline relative to the second belted conveyor section. The at least one continuous conveyor belt may comprise a first continuous belt reeved around the first rollers of the first belted conveyor section and a second continuous belt reeved around the guide roller and the second roller or rollers of the second belted conveyor section. Each of the first and second belted conveyor sections may include a driven roller that is rotatably drivable to drive a respective one of the first and second continuous belts.

Optionally, the second conveyor section may be at a decline relative to the first conveyor section, such that the adjustable assembly and guide roller may function as a nose-over assembly. The at least one continuous conveyor belt may comprise a single continuous conveyor belt reeved around the guide roller and the first and second rollers.

Optionally, at least one of the first and second belted conveyor sections may include a driven roller that is rotatably drivable to drive a respective continuous conveyor belt. Optionally, each of the first and second belted conveyor sections may include a driven roller that is rotatably drivable to drive a respective one of first and second continuous conveyor belts. The driven rollers of the first and second belted conveyor sections may be operable at different speeds. Optionally, the driven roller may comprise a motorized roller having an internal motor that is operable to rotatably drive a roller portion of the roller relative to a shaft portion of the roller.

According to another aspect of the present invention, an adjustable assembly for connecting adjacent belted conveyor sections includes a pair of adjustable connectors and a roller mounted to and positioned between the pair of adjustable connectors. The adjacent belted conveyor sections may be angularly positioned relative to one another, such as inclined or declined at an angle relative to one another. Each of the adjustable connectors includes a body and first and second connecting links. Each body is positionable between the respective sidewalls of the adjacent belted conveyor sections and includes a shaft receiving aperture for receiving a shaft of the roller. The first connecting link extends from one end of the respective body and the second connecting link extends from an opposite end of the respective body. The first and second connecting links are pivotable about a pivot axis relative to the body to align with the respective sidewalls of the respective adjacent belted conveyor sections. The pivot axis is generally coaxial with the shaft receiving apertures of the connector bodies. The first and second connecting links are securable to the respective belted conveyor sections to connect the belted conveyor sections to the body.

In one form, the first and second connecting links comprise first and second upper connecting links positioned at an upper portion of each body and configured to secure to upper portions of the respective sidewalls of the respective belted conveyor sections. The adjustable assembly may also include first and second lower connecting links positioned at a lower portion of each body and configured to secure to lower portions of the respective sidewalls of the respective belted conveyor sections. The upper and/or lower connecting links may be adjustably positioned along the sidewalls to accommodate angular adjustment of the belted conveyor sections relative to one another.

The present invention thus provides an adjustable assembly for connecting to adjacent conveyor sections and providing for relative angular adjustment of the conveyor sections. In one form, a downstream belted conveyor section may be inclined relative to an upstream belted conveyor section, such as in applications where the upstream belted conveyor section comprises a generally horizontal conveyor section and the downstream belted conveyor section comprises an inclined conveyor section (or where the upstream belted conveyor section comprises a declined conveyor section and the downstream belted conveyor section comprises a generally horizontal conveyor). The upstream belted conveyor section may include at least two rollers rotatably mounted to and positioned between the opposite sidewalls and a first continuous belt reeved around the at least two rollers. A second continuous belt may be reeved around a guide roller of the adjustable assembly and at least one roller of the downstream belted conveyor section. The guide roller is positioned to be generally aligned with the rollers of the upstream belted conveyor section.

In yet another form, the downstream belted conveyor section may be at a decline relative to the upstream belted conveyor section, such as in applications where the upstream belted conveyor section may comprise a generally horizontal conveyor section and the downstream belted conveyor section may comprise a declined conveyor section. The belted conveyor sections may include a single continuous belt reeved around at least one roller of each of the belted conveyor sections and over a guide roller of the adjustable connector. The adjustable assembly may include a second guide roller positioned generally below the first guide roller for guiding a lower run of the continuous belt below the first guide roller and between the belted conveyor sections.

Therefore, the present invention provides an adjustable assembly for connecting adjacent belted conveyor sections together at an incline or decline joint between the sections. The adjustable assembly is adaptable to connect adjacent sections which may be at various angles relative to one another, such that specialized plates and components are not required to connect the sections. The adjustable assembly provides a secure connection between the sections, and mounts a roller which may be common to one or both of the adjacent conveyor sections. The adjustable assembly may be readily adjusted to accommodate different conveyor layouts or changes in a particular conveyor layout.

These and other objects, advantages, purposes and features of the present invention will become apparent upon review of the following specification in conjunction with the drawings.

DESCRIPTION OF THE PREFERRED EMBODIMENTS

Figure 1:
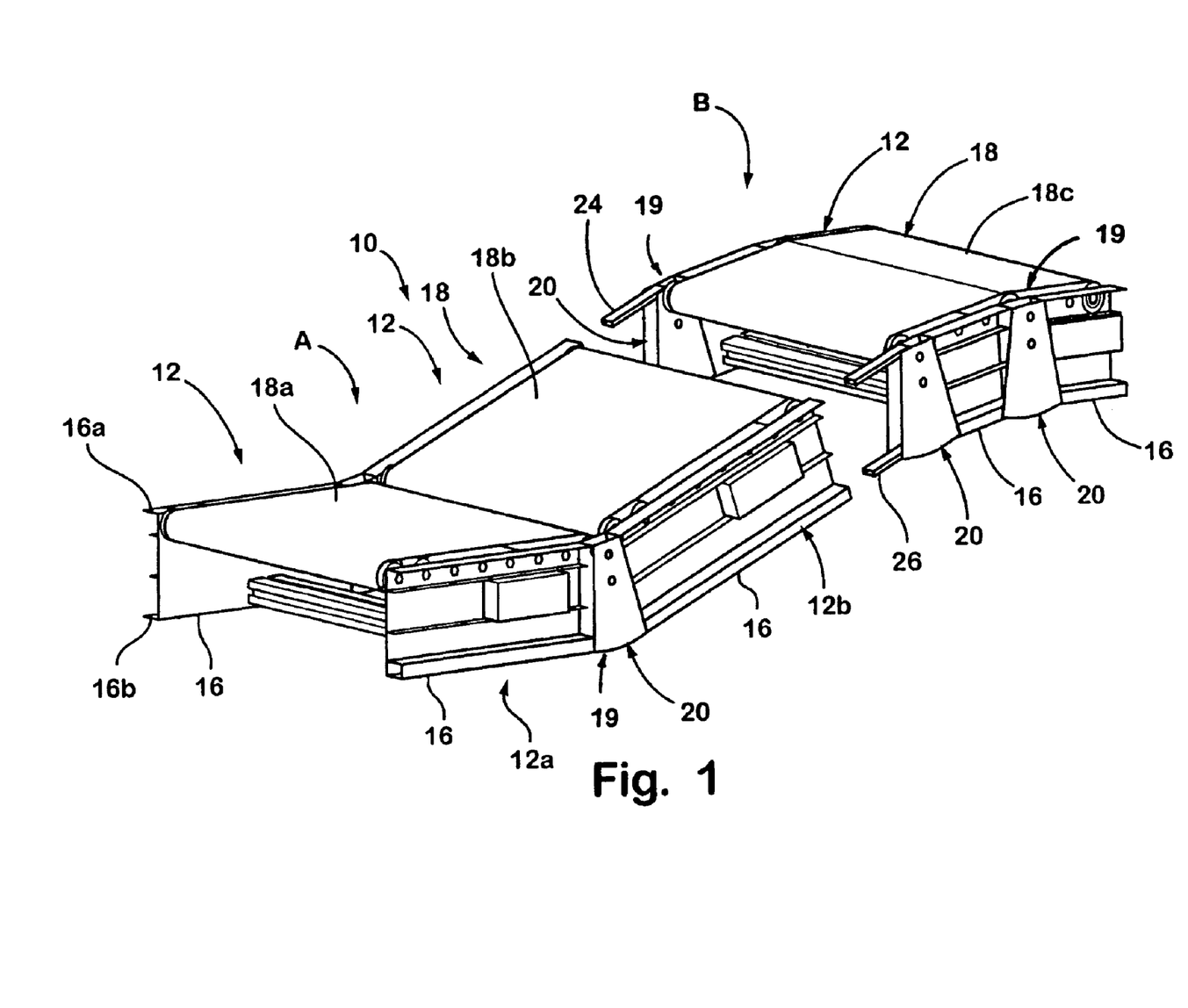
FIG. 1 is a perspective view of a conveyor unit or system which includes adjacent conveyor sections connected together with an adjustable assembly in accordance with the present invention.
Figure 2:
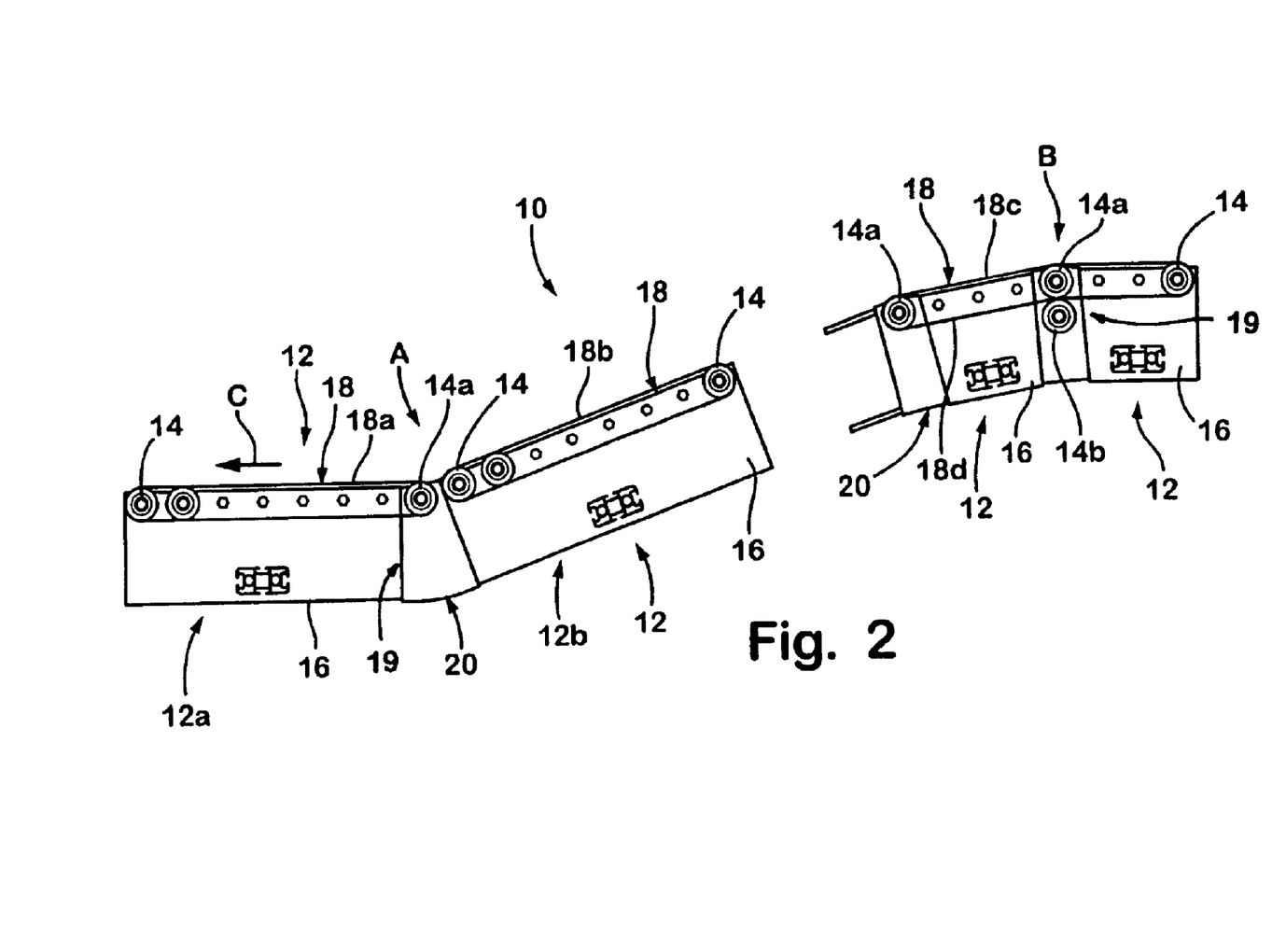
FIG. 2 is a side elevation of the conveyor system and adjustable assemblies of FIG. 1.

Referring now specifically to the drawings and the illustrative embodiments depicted therein, a conveyor unit or adjustable conveyor system 10 comprises a plurality of conveyor sections 12 (FIGS. 1 and 2). Conveyor sections 12 include at least one generally cylindrical roller 14 rotatably mounted between a pair of substantially parallel opposite sidewalls 16 and a continuous belt 18 routed or reeved around the rollers 14 and defining a conveying surface at an upper portion of the conveyor sections. The belt or belts of the conveyor sections may be supported by rollers or slide plates or the like between the end rollers of the sections to provide a conveying surface along the conveyor sections. The conveyor sections 12 are connected together at each sidewall 16 via an adjustable nose-over assembly or adjustable incline/decline assembly or adjustable connector assembly 19. Adjustable assembly 19 includes a pair of adjustable connectors 20 and is adjustable to accommodate an incline or decline from one conveyor section to the other, as discussed below. The adjustable connectors are positioned at opposite sides of the conveyor unit and adjustable to establish a desired or appropriate relative angle between the adjacent conveyor sections, as also discussed below.

As shown in FIGS. 1 and 2, adjustable assembly 19 and adjustable connectors 20 may be part of or incorporated into a conveyor unit 10, which may comprise the downstream and upstream conveyor sections 12a, 12b, and which may be angularly adjustable to align the upstream and downstream conveyor sections with existing conveyor sections or conveyors at the transport conveyor or conveyor system. The adjustable connectors 20 may adjust about their pivot axis to align the upstream and downstream conveyor sections with the existing conveyors and may be substantially secured at the desired or appropriate angle, as discussed below. One of the rollers of each of the downstream and upstream conveyor sections 12a, 12b may comprise a driven roller or pulley to drive the respective conveyor belt 18b, 18a about the rollers of the conveyor sections. The driven rollers or pulleys may be independently operable to drive the conveyor belt or belts to convey articles along the conveyor unit. Optionally, the adjustable connectors may mount a driven roller or pulley therebetween for driving a continuous conveyor belt reeved over or around the driven roller or pulley at the adjustable connectors.

In situations where the downstream conveyor section 12a is inclined relative to the upstream conveyor section 12b (such as when the upstream conveyor section is generally horizontal and the downstream conveyor section is inclined, or such as when the upstream conveyor section is declined and the downstream conveyor section is generally horizontal as shown at A in FIGS. 1 and 2), the driven roller or pulley of the downstream conveyor section may be operable at a greater speed than the driven roller or pulley of the upstream conveyor section to move the articles away from the angled joint as they are conveyed onto the downstream conveyor section, in order to limit or substantially preclude sequential articles from hitting one another at the adjustable assembly or connectors. For example, the driven roller or pulley of the downstream conveyor section may be operable at approximately a 20% faster rate than the driven roller or pulley of the upstream conveyor section. The different rates may be controlled by software or controls at the conveyor unit and may be adjusted depending on the angle between the conveyor sections.

Optionally, the conveyor unit 10 may be angled such that the downstream conveyor section is at a decline relative to the upstream conveyor section (such as shown at B in FIGS. 1 and 2). In such an arrangement, the conveyor unit may include a single continuous conveyor belt 18c reeved around the rollers of the upstream and downstream conveyor sections and around the roller or rollers of adjustable assembly 19. One of the conveyor sections, and desirably the downstream conveyor section, may include a driven roller or pulley to drive the single continuous conveyor belt along the conveyor unit. The other conveyor section may include only idler rollers or pulleys or may also include a driven roller or pulley that may be operable at the same rate as the driven roller or pulley of the other or downstream conveyor section.

The driven rollers or pulleys may comprise any type of driven roller or pulley, such as a directly driven roller or pulley, such as a motorized roller or the like. For example, the driven roller may comprise a motorized or self-driven roller with an internal motor that is operable to rotate a roller portion of the motorized roller relative to a shaft portion or axle portion or mounting portion of the motorized roller. The axle portion of the motorized roller may be mounted at each end of the motorized roller to the sidewalls of the respective conveyor section. For example, the motorized roller may be of the type commercially available from various sources, such as a 12-volt DC or 24-volt DC motorized roller or the like. Optionally, the motorized roller may comprise a DC motorized roller, such as a 12-volt DC motorized roller or the like, such as a roller of the type disclosed in U.S. Pat. No. 6,244,427, the disclosure of which is hereby incorporated herein by reference. Optionally, the motorized roller may comprise a 24-volt DC motorized roller or a 42-volt DC motorized roller or a 48-volt DC motorized roller or the like. For example, the motorized roller may comprise a 48-volt DC motorized roller having a diameter of approximately 100 mm (or 50 mm) and an overall width of between 450 mm and 900 mm, or any other desired width to span the desired number of idler rollers. The 48-volt DC motorized roller may comprise a DC brushless motor and may be operable, for example, at speeds between approximately 130 rpm and 1,150 rpm, and may provide an output of approximately 3–10 Nm of torque at approximately 400 rpm and approximately 1.5 Nm of torque at approximately 1,150 rpm. It is further envisioned that the motorized roller may comprise other DC powered motorized rollers, or may comprise an AC powered motorized roller, such as described in U.S. Pat. No. 5,442,248, the disclosure of which is hereby incorporated herein by reference, without affecting the scope of the present invention. The motor of the motorized roller may drive the roller portion directly, such as disclosed in U.S. Pat. No. 6,244,427, or may drive the roller via a gear train or the like, such as disclosed in U.S. Pat. No. 5,442,248, the disclosures of which are hereby incorporated herein by reference.

The other rollers or pulleys of the conveyor unit or conveyor sections or adjustable connectors may comprise idler rollers or pulleys. The idler rollers or pulleys of the conveyor sections or unit may be conventional, freely rotating rollers, such as the types commercially available from various sources. The shafts of the idler rollers may be mounted within holes or apertures in the sidewalls of the conveyor sections and/or the adjustable connectors to limit or substantially preclude rotation of the shafts when the roller portions of the idler rollers are rotated due to the driving of the conveyor belt via activation of the driven roller or pulley.

Each of the adjustable connectors 20 of adjustable assembly 19 comprises a body or housing assembly 22 and a pair of upper pivot bars or links or connecting bars or links 24 extending from an upper portion of housing assembly 22 and pivotable relative to housing assembly 22. Adjustable connector 20 also includes a pair of lower pivot or connecting bars or links 26 extending from a lower portion of housing assembly 22 and pivotable relative to housing assembly 22. Connecting links 24, 26 are pivotable to align with the conveyor sections that adjustable connectors 20 are mounted to, as discussed below. The adjustable connectors at each side of the conveyor sections or conveyor unit are substantially the same. Although directed at one adjustable connector, the description and figures discussed below apply to each connector at the opposite sides of the adjustable assembly and the conveyor sections or conveyor unit.

As best shown in FIGS. 3–10, body or housing assembly 22 of each adjustable connector 20 includes a base portion 28 and a cover portion 30. Base portion 28 includes a generally flat base plate 28a and a generally cylindrical pivot boss 28b extending from base plate 28a for pivotally mounting connecting links 24, as discussed below. Pivot boss 28b is preferably positioned at and generally around a shaft receiving aperture 28c (FIG. 7) through base plate 28a. Shaft receiving aperture 28c may be a non-circular aperture, such as a hexagonal shaped aperture or the like, and is configured to receive a correspondingly formed axle or shaft end of a guide roller 14a therethrough to mount the guide roller 14a at and between the opposite adjustable connectors 20. A second shaft receiving aperture 28d through base plate 28a may be positioned generally below shaft receiving aperture 28c for receiving an axle or shaft end of a lower guide roller 14b (FIG. 2), as discussed below. As can be seen with reference to FIG. 2, guide roller 14a may function as an end roller or belt reversing roller of one of the adjacent conveyor sections 12, such as the downstream conveyor section 12a, or may function as a nose-over support of a single continuous conveyor belt over both conveyor sections.

Figures 3, 4:
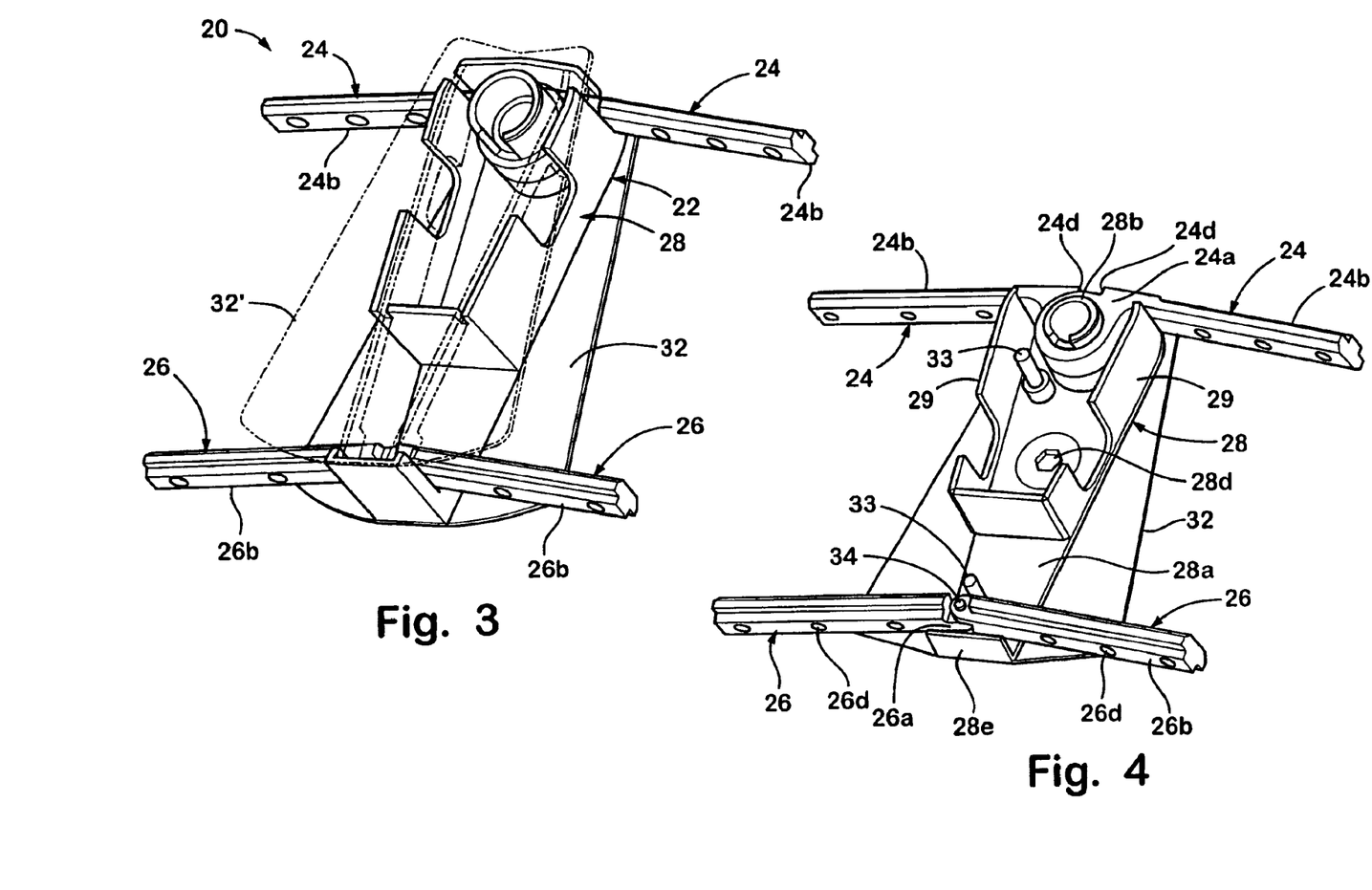
FIG. 3 is a perspective view of an adjustable connector in accordance with the present invention.
FIG. 4 is a perspective view of the adjustable connector of FIG. 3, with the cover portion removed to show additional details.
Figure 5:
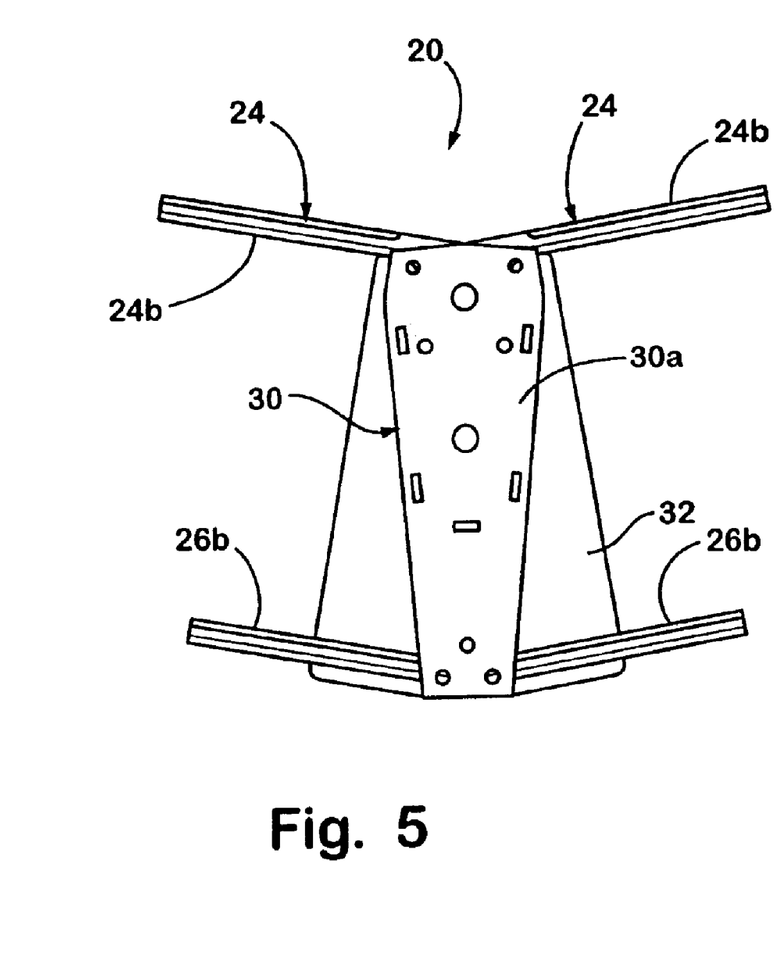
FIG. 5 is a side elevation of the adjustable connector of FIGS. 3 and 4, with the outer protective cover removed.
Figure 6:
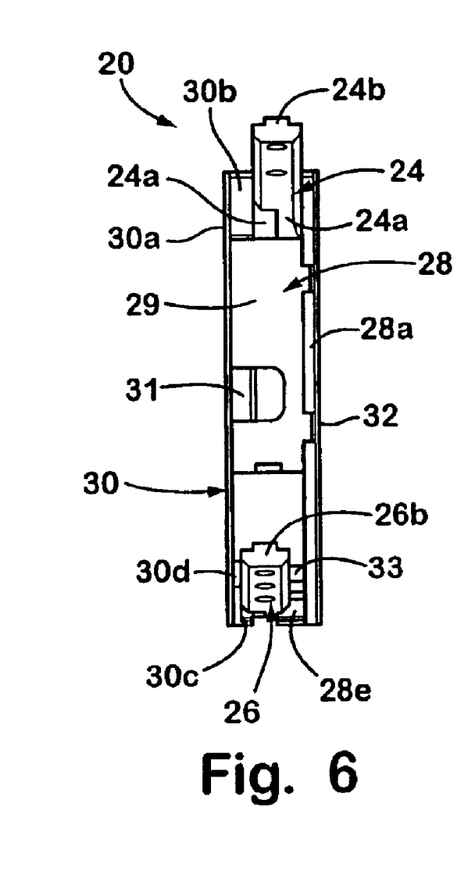
FIG. 6 is an end elevation of the adjustable connector of FIGS. 3 and 5.
Figure 7:
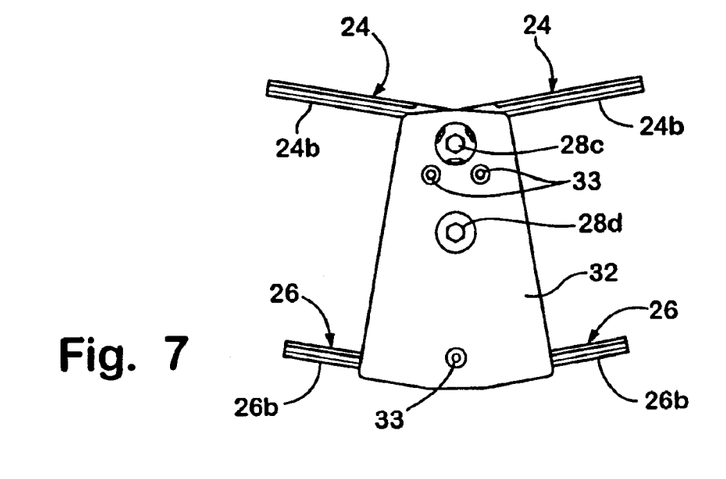
FIG. 7 is a side elevation of the adjustable connector of FIGS. 3–6, shown from the opposite side of the elevation of FIG. 5.
Figure 8:
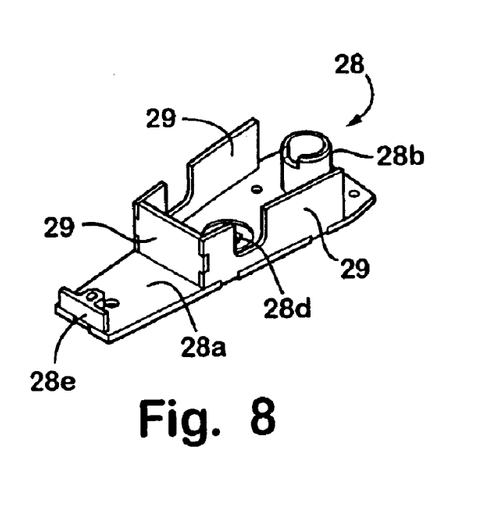
FIG. 8 is a perspective view of a base portion of the adjustable connector of FIGS. 3–7, with the cover portion and connecting links removed therefrom.

Base portion 28 further includes a lower pivot block 28e at a lower end of base plate 28a for pivotally mounting the ends of the lower connecting links 26. As best shown in FIGS. 4 and 8, base portion 28 includes housing side and bottom walls 29, which define a compartment generally around the perimeter of an upper portion of base plate 28a. Housing walls 29 are configured to engage corresponding walls or plates 31 of cover portion 30 when cover portion 30 is mounted to base portion 28, as discussed below.

Figure 9:
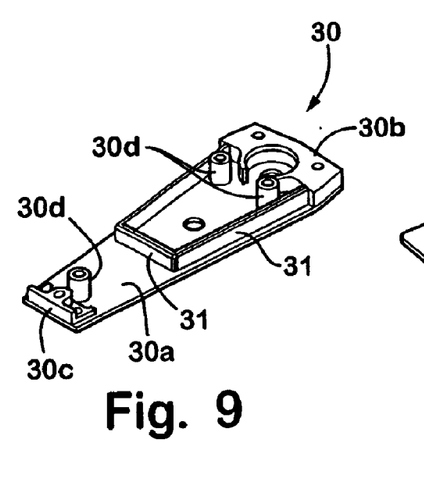
FIG. 9 is a perspective view of a cover portion of the adjustable connector of FIGS. 3–7, with the base portion and connecting links.

As best shown in FIG. 9, cover portion 30 includes a cover plate 30a and an upper pivot block 30b at an upper portion of cover plate 30a. A lower pivot block 30c is positioned at a lower portion of cover plate 30a. Cover portion 30 also includes side and bottom housing plates or walls 31 which are positioned generally around a perimeter of an upper portion of cover plate 30a and inwardly of the perimeter edge of cover plate 30a. Cover portion 30 may also include one or more bosses 30d, such as threaded bosses or the like, extending from plate 30a for securing housing assembly 22 together via pins or threaded fasteners 33 (FIG. 7), as discussed below.

Figure 10:
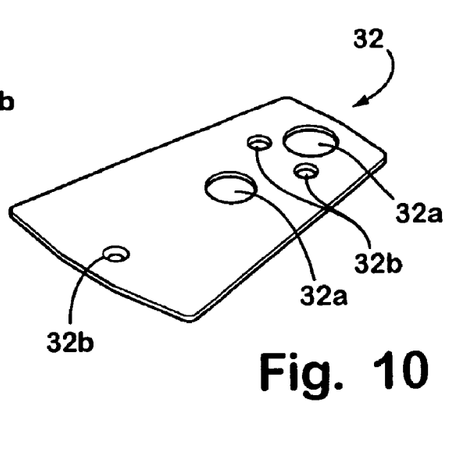
FIG. 10 is a perspective view of a protective plate for the adjustable connector of FIGS. 3–7.

Adjustable connector 20 may include a protective plate or guard 32 at one or both sides of housing portion 22, to substantially contain and conceal the housing portion and pivot blocks throughout the range of angular adjustment of the adjustable connector 20. As shown in FIG. 10, protective plate 32 may include a pair of generally circular apertures 32a, which generally correspond with the shaft receiving apertures 28c, 28d of base portion 28 when protective plate 32 is secured to housing portion 22. An outer protective plate or cover 32' (FIG. 3) may not require such openings and may function to substantially cover the body or housing assembly 20. Pins or fasteners 33 may insert through multiple fastener holes or openings 32b in protective plate 32 and may thread into and tighten within threaded bosses 30d of cover portion 30 to secure housing portion 22 together and to secure protective plate 32 to housing portion 22. The outer or second protective cover plate 32' may be provided at the opposite side of housing portion 22 (or the cover plate 30a may be oversized at its outer surface) to provide sufficient coverage of the housing assembly, without affecting the scope of the present invention.

Figure 11A:
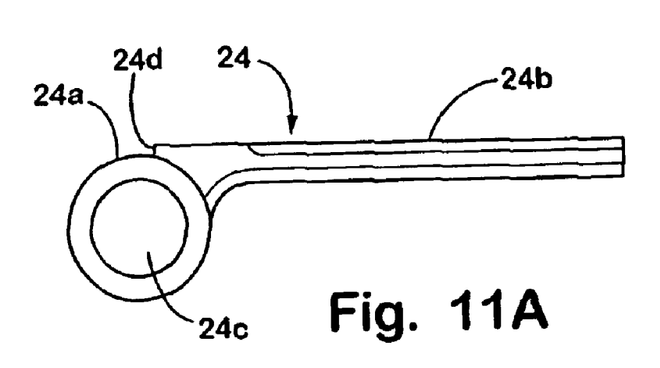
FIGS. 11A–C are side, top and end views of an upper connecting link useful with the adjustable connector of the present invention.
Figure 11B:
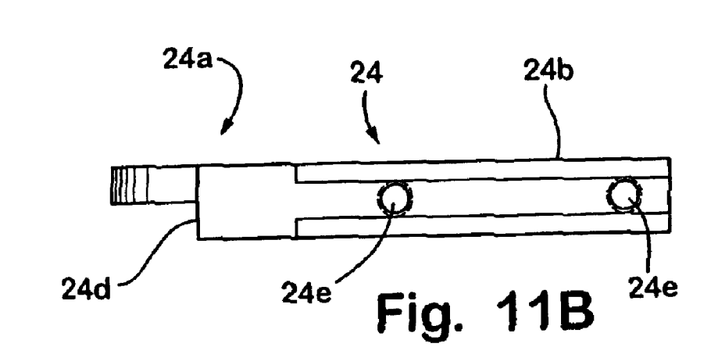
Figure 11C:
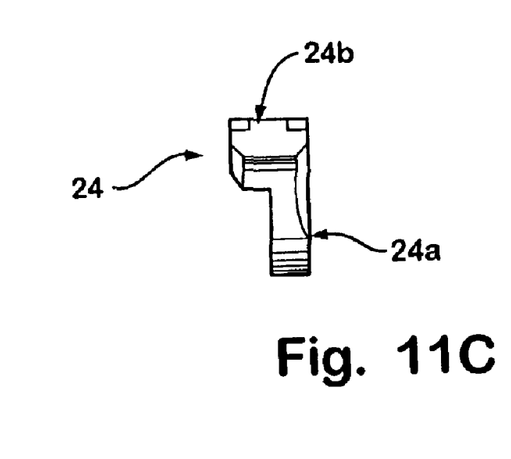

As best shown in FIGS. 11A–C, upper connecting arms or links 24 comprise a generally circular portion 24a and an arm or extension 24b extending from circular portion 24a. Circular portion 24a may be offset to one side of connecting link 24 (as can be seen in FIGS. 11B an 11C) and defines a generally cylindrical passageway 24c for pivotally receiving pivot boss 28b therethrough when the connecting link is pivotally mounted to the body portion or assembly 22.

Because circular portion 24a may be offset to one side, connecting links 24 may be common parts, with the circular portions 24a overlapping one another when mounted to pivot boss 28b, as can be seen in FIG. 4. A pivot stop 24d may be formed at the end of the arm 24b at circular portion 24a to limit upward pivotal movement of the connecting links 24 relative to one another. The upward pivotal movement of the arms 24b may thus be limited by the pivot stops 24d contacting one another as the connecting links pivot about pivot boss 28b in an upward direction with respect to FIGS. 5 and 7.

Arms 24b of upper connecting links 24 may be formed to fit or slide within and along corresponding slots or channels 16a (FIG. 1) along the upper portion of the sidewalls 16 of the conveyor sections 12. Each arm 24b includes at least one mounting aperture 24e therethrough for receiving one or more fasteners to secure arms 24b within the channels 16a of the conveyor section 12. The mounting aperture or apertures 24e may be aligned with a corresponding aperture or apertures (not shown) in sidewall 16 and secured thereto via the fastener or fasteners to substantially preclude sliding movement of connecting link 24 along the sidewall. The arms may be adjustably mounted to the sidewalls and may be adjusted, such as via moving the arms to align with different mounting holes in the sidewalls, in order to increase or decrease a gap between the upper portions of the sidewalls to accommodate angular adjustment of the sidewalls relative to one another.

Figure 12A:
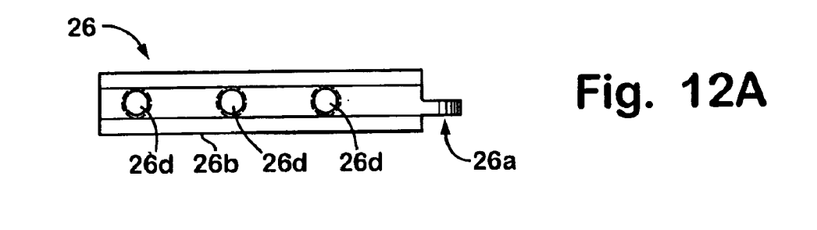
FIGS. 12A and 12B are plan and side views of a lower connecting link useful with the adjustable connector of the present invention.
Figure 12B:
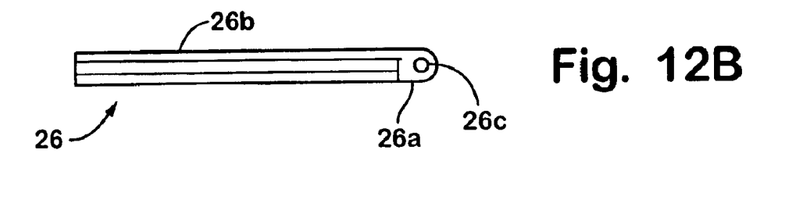

Similarly, and as best shown in FIGS. 12A and 12B, lower connecting links 26 include a pivot mounting portion 26a and an arm portion 26b extending from pivot portion 26a. Pivot portion 26a includes a generally circular opening or passageway 26c therethrough for pivotally receiving a pivot pin 34 (FIG. 4) to pivotally retain connecting links 26 at and between lower pivot blocks 28e and 30c of housing portion 22. Pivot portions 26a may be offset to one side at the ends of arm portions 26b to allow connecting links 26 to be common parts, with the circular portions 26a overlapping one another when mounted at pivot blocks 28e, 30c, as can be seen in FIG. 4.

Similar to arm portions 24b of upper connecting links 24, arm portions 26b of lower connecting links 26 are formed to fit or slide within and along corresponding slots or channels 16b (FIG. 1) along the lower portion of the sidewalls 16 of the conveyor sections 12. Each arm 26b includes at least one mounting aperture 26d therethrough for receiving one or more fasteners to secure arms 26b within the channels 16b of the respective conveyor section 12. The mounting aperture or apertures 26d may be aligned with a corresponding aperture or apertures (not shown) in sidewall 16 and secured thereto via a fastener or fasteners to substantially preclude sliding movement of connecting link 24 along the sidewall. Similar to the upper connecting links, the lower arms may be adjustably mounted to the sidewalls and may be adjusted to increase or decrease a gap between the lower portions of the sidewalls to accommodate angular adjustment of the sidewalls relative to one another.

When adjustable connector 20 is assembled, connecting links 24 are positioned around pivot boss 28b, while connecting links 26 are positioned at lower pivot block 28e and retained via pivot pin 34. Walls 31 of cover portion 30 may be received within walls 29 of base portion 28, while pivot boss 28b may be received within upper pivot block 30b. The fasteners 33 may then be inserted through protective plate or guard plate 32 and further through corresponding holes in base plate 28a and into bosses 30d, where they may be tightened to secure adjustable connector 20 together. When assembled, connecting links 24 are pivotable about pivot boss 28b, while connecting links 26 are pivotable about pivot pin 34 at lower pivot blocks 28e, 30c.

An assembled adjustable connector 20 may be positioned at an end of each sidewall 16 of a conveyor section 12 by inserting one of the upper connecting link arms 24b into the channel or slot 16a in the upper portion of the sidewall 16, while also inserting one of the lower connecting link arms 26b into the channel or slot 16b in the lower portion of the sidewall 16. A guide roller 14a is rotatably mounted to and between adjustable connectors 20 by inserting the axle shaft ends of the roller through the shaft receiving apertures 28c of base plate 28a of each adjustable connector 20. The arm portions 24b, 26b of the other connecting links 24, 26 may then be pivoted to align with the other conveyor section. The arms 24b, 26b may be adjustably positioned relative to the sidewall channels to provide an appropriate location of the body or housing portion 22 between the conveyor sections and may be adjusted to generally align the openings in the arms with an appropriate opening along the sidewall channels of the conveyor sections. The connecting link arms 24b, 26b may then be secured within the channels 16a, 16b via one or more fasteners (not shown). After the arms are secured relative to the sidewalls of both conveyor sections, the adjustable connector is substantially fixed at the desired angle between the conveyor sections.

As shown in FIGS. 1 and 2, adjustable assembly 19 may be positioned at a joint or bend between two angularly positioned conveyor sections, such as, for example, where a first or upstream or feed conveyor section is at a decline toward a second or downstream conveyor section (shown generally at A), or where a second or downstream conveyor section is at an incline relative to a generally horizontal first or feed conveyor section (not shown). When positioned at an incline joint A, with the direction of conveyance in the direction of the arrow C in FIG. 2, the guide roller 14a of adjustable assembly 19 comprises an end roller or reversing roller for the belt 18a of the downstream conveyor section 12a. A continuous belt 18a is thus reeved around roller 14a and the roller or rollers 14 of the downstream conveyor section 12a, while a second continuous belt 18b is reeved around the rollers 14 of the upstream conveyor section 12b. Roller 14a is positioned so as to be generally aligned with the rollers 14 of upstream conveyor section 12b (as can be seen in FIG. 2), such that an article being conveyed along upstream conveyor section 12b will not substantially engage roller 14a, but will have a smooth transition onto the belt 18a of downstream conveyor section 12a. Guide roller 14a is also aligned with the roller or rollers of downstream conveyor section 12a so that the belt 18a defines a generally flat and continuous conveying surface along the downstream conveyor section. Similarly, if the downstream conveyor section were at an incline relative to a generally horizontal upstream conveyor section, then roller 14a of adjustable assembly 19 may again comprise an end roller or reversing roller for the belt 18a of the inclined downstream section 12b, and may be generally aligned with the rollers of the upstream conveyor section to provide a smooth transition onto the inclined downstream conveyor section.

In such applications, the arms 26b of lower connecting links 26 may be adjusted relative to the sidewalls to allow for a greater gap between the lower portions of the sidewalls due to the upward angle or acute angle of the sidewalls relative to one another. For example, the arms of the connecting links may be inserted less into the channels 16b of one or both sidewalls 16 as the angle of incline of the downstream conveyor section 12a relative to the upstream conveyor section 12b is increased. Optionally, the arms 24b of upper connecting links 24 may also or otherwise be adjusted to accommodate the angular position of the conveyor sections. Optionally, the opposed ends of the sidewalls of the conveyor sections may be cut at an angle to accommodate the angular position of the conveyor sections.

Alternately, if adjustable assembly 19 is positioned at a downward angled or decline joint or bend (shown generally at B in FIGS. 1 and 2), the roller 14a of adjustable assembly 19 may comprise a common guide roller for both conveyor sections 12, as shown in FIGS. 1 and 2, such that the adjustable connectors function as a nose-over assembly. A single continuous conveyor belt 18c may be reeved around the rollers 14 of the conveyor sections 12 and over guide roller 14a of adjustable assembly 19. The guide roller 14a thus may be generally aligned with the rollers or conveying surface of both conveyor sections 12. In such applications, a second guide roller 14b (FIG. 2) may be mounted at and between the adjustable connectors 20 at the lower shaft receiving apertures 28d of base plate 28a, to guide and support the lower run 18d of the belt 18c along the angle at or below the underside of guide roller 14a. In such decline or nose-over applications, the arms 26b of lower connecting links 26 may be adjusted relative to the sidewalls to allow for a lesser gap between the lower portions of the sidewalls due to the downward angle of the sidewalls relative to one another. For example, the arms of the connecting links may be inserted further into the channels 16b of sidewalls 16 of one or both of the conveyor sections as the angle of decline of the downstream conveyor relative to the upstream conveyor is increased. Optionally, the arms 24b of upper connecting links 24 may also or otherwise be adjusted to accommodate the angular position of the conveyor sections. Optionally, the opposed ends of the sidewalls of the conveyor sections may be cut at an angle to accommodate the angular position of the conveyor sections.

The adjustable assembly 19 and adjustable connectors 20 thus provide for a smooth transition from an upstream conveyor section to a downstream conveyor section for various relative angles between the sections. The adjustable connectors are adjustable to provide such smooth transition between the conveyor sections throughout the range of adjustment of the connectors, such as between a downward or decline angle of up to approximately 10 degrees or more and an upward or incline angle of up to approximately 20 degrees or more. The adjustable assembly may be provided at a gap between adjacent sections of a conveyor. Optionally, an adjustable conveyor unit may comprise an upstream conveyor section and a downstream conveyor section with an adjustable assembly positioned therebetween. The adjustable conveyor unit may be positioned within a gap between existing conveyor sections and may be angularly adjusted to align the opposite ends of the upstream and downstream conveyor sections with the existing conveyor sections. The upstream and downstream conveyor sections may be angled or pivoted about the pivot axis of the adjustable connectors to align with the existing conveyor sections. If the downstream conveyor section is at an incline relative to the upstream conveyor section, the adjustable conveyor unit may include separate continuous conveyor belts at the respective upstream and downstream conveyor sections. If the downstream conveyor section is at a decline relative to the upstream conveyor section, the adjustable conveyor unit may include a single continuous conveyor belt reeved around the rollers of both the upstream and downstream conveyor sections.

The adjustable assembly of the present invention thus may be positioned between adjacent belted conveyor sections and may provide a substantially smooth transition from an upstream belted section to a downstream belted section. The adjustable assembly may provide such a transition to a downstream conveyor section that is either inclined (where the downstream conveyor section may have a belt reeved around the guide roller of the adjustable connector) or declined (where both conveyor sections may share a common conveyor belt) relative to an adjacent upstream conveyor section. The adjustable assembly may be readily adaptable to accommodate different angles between the adjacent conveyor sections and may provide a smooth transition throughout the range of angular adjustment of the adjustable assembly.

Figure 13:
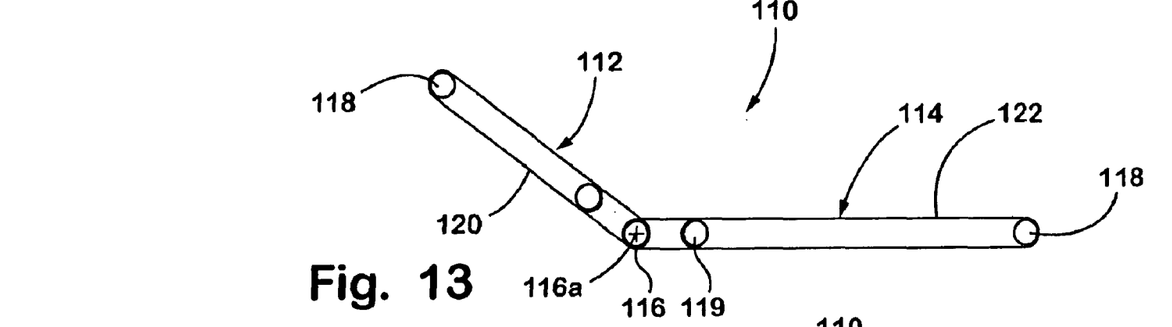
FIG. 13 is a side elevation of another conveyor unit or system and adjustable assembly in accordance with the present invention.
Figure 14:
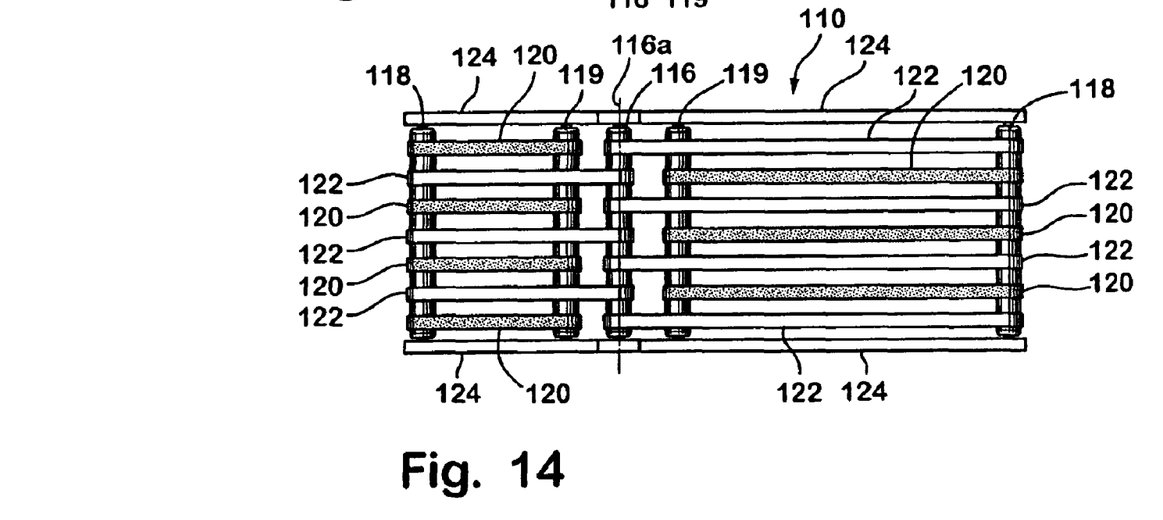
FIG. 14 is a plan view of the conveyor unit and adjustable assembly of FIG. 13.

Referring now to FIGS. 13 and 14, an adjustable conveyor joint or section or unit 110 includes a pair of adjacent conveyor sections 112, 114 which share a common end roller 116, which defines a pivot axis 116a about which the sections 112, 114 may pivot to adjust the relative angle of incline or decline between the conveyor sections 112, 114. Each section 112, 114 includes an end roller 118 and a second roller 119 adjacent to common roller 116 (the sections may include additional rollers or support surfaces or slide plates between the rollers 118, 119, without affecting the scope of the present invention). A plurality of belt strips 120 are reeved around the rollers 118, 119 and spaced apart along the rollers 118, 119. Likewise, a plurality of belt strips 122 are reeved around roller 116 and roller 118 of each section 112, 114 and positioned generally between strips 120. The rollers are rotatably mounted between opposite sidewalls 124 of the conveyor sections.

Optionally, common roller 116 may comprise a motorized roller which has an internal motor within the roller portion that functions to rotate the cylindrical portion of the roller relative to the shaft portion, such as a motorized roller of the type commercially available from various sources, such as a 12 volt DC or 24 volt DC or 48 volt DC motorized roller or the like. Accordingly, when the shaft portions are substantially fixed or non-rotatable, actuation of the motorized roller 116 causes rotation of the cylindrical portion, which subsequently causes movement of belt strips 122 and thus, rotation of the slave rollers 118 via the belt strips 122. Rotation of rollers 118 further causes movement of belt strips 120 and corresponding rotation of rollers 119 of sections 112, 114. The belt strips 122, 120 thus are movable together via operation of motorized roller 116 and define conveying surfaces for the sections 112, 114. Although shown and described as a motorized roller, driven roller 116 may be otherwise driven via any known means, without affecting the scope of the present invention.

Optionally, belt strips 120, 122 may comprise a low modulus belt material which provides approximately a 1% to 2% or more initial stretch in its lengthwise direction and a 2% or more stretch characteristic in its lengthwise direction, such as belt material of the type described in U.S. patent application, Ser. No. 10/358,690, filed Feb. 5, 2003 by Cotter et al., which is hereby incorporated herein by reference in its entirety. Such a low modulus belt material provides a substantially greater amount of stretch over conventional conveyor belts, which may only provide approximately 1% stretch characteristic. The low modulus belt strips may be made from urethane extrusions or urethane with polyester or nylon tension members encapsulated, and may be similar to the type of belts commercially available from Nitta Corporation for use in graphic arts and letter mail sorting. Optionally, the rollers 116, 118, 119 may comprise generally cylindrical rollers with crowned shells at the belt strips to assist in tracking the belt strips on the rollers.

The adjustable conveyor sections 112, 114 are thus pivotable relative to one another about pivot axis 116a defined by common roller 116 and may be oriented to align between sections or surfaces of a conveyor system or the like. The belt strips 120, 122 function together to define a conveying surface between the end rollers 118 of sections 112, 114 to convey product from one end of the adjustable conveyor 110 to the other. The opposite ends of the sections 112, 114 may be aligned with and connected to adjacent conveyor sections or surfaces or the like (not shown) to connect the conveyor sections or surfaces via adjustable sections 112, 114.

Therefore, the present invention provides an adjustable conveyor unit or an adjustable assembly which may be adapted to secure conveyor sections together at various angles. The connecting links of the adjustable connector or connectors of the present invention function to substantially rigidly and fixedly secure the adjustable connector to the adjacent conveyor sections and, thus, to substantially fixedly secure the adjacent conveyor sections relative to one another. The guide roller mounted at the adjustable connectors is likewise generally fixedly mounted at the end of one of the conveyor sections as an end roller for that conveyor section or between the conveyor sections as a guide roller for a single continuous belt along both conveyor sections. The guide roller is positioned to generally align with the rollers of the upstream conveyor section so as to provide a smooth transition onto the downstream conveyor section. In applications where the downstream conveyor section is at a declined angle relative to the upstream conveyor section, and the adjustable assembly thus functions as a nose-over connector and is positioned to align with the rollers of both conveyor sections. The adjustable assembly of the present invention thus may be adapted to join adjacent conveyor sections at various angles and at incline or decline joints or bends, without requiring specialized plates and components to connect the sections.

Changes and modifications in the specifically described embodiments can be carried out without departing from the principles of the present invention, which is intended to be limited only by the scope of the appended claims, as interpreted according to the principles of patent law.

The embodiments of the invention in which an exclusive property or privilege is claimed are defined as follows:

1. A conveyor unit comprising:
   a first belted conveyor section having opposite sidewalls and at least one first roller;
   a second belted conveyor section having opposite sidewalls and at least one second roller, said conveyor unit having a direction of conveyance from said first belted conveyor section to said second belted conveyor section;
   at least one continuous conveyor belt defining at least one conveying surface, said at least one continuous conveyor belt being reeved around at least some of said rollers; and
   an adjustable assembly positioned between said first and second belted conveyor sections, said adjustable assembly comprising a guide roller mounted at and between opposite sides of said adjustable assembly and defining a pivot axis therealong, wherein said adjustable assembly is configured to pivot about said pivot axis and to align said guide roller with said rollers of said belted conveyor sections throughout a range of pivotal adjustment of said adjustable assembly such that an article on said first belted conveyor section does not substantially engage said guide roller of said adjustable assembly as the article is conveyed from said first belted conveyor section to said second belted conveyor section.

2. The conveyor unit of claim 1, wherein said range of pivotal adjustment comprises pivoting said second belted conveyor section relative to said first belted conveyor section between at least approximately five degrees of an incline relative to said first belted conveyor section and at least approximately five degrees of a decline relative to said first belted conveyor section.

3. The conveyor unit of claim 1, wherein said at least one continuous conveyor belt comprises a first continuous belt reeved around said at least two first rollers of said first belted conveyor section and a second continuous belt reeved around said guide roller and said at least one second roller of said second belted conveyor section.

4. The conveyor unit of claim 3, wherein each of said first and second belted conveyor sections includes a driven roller that is rotatably drivable to drive a respective one of said first and second continuous belts.

5. The conveyor unit of claim 4, wherein said driven rollers are operable at different speeds.

6. The conveyor unit of claim 3, wherein said first belted conveyor section is positionable at a decline relative to said second belted conveyor section.

7. The conveyor unit of claim 1, wherein said at least one continuous conveyor belt comprises a single continuous conveyor belt reeved around said guide roller and said at least one first roller and said at least one second roller, said second conveyor section being at a decline relative to said first conveyor section.

8. The conveyor unit of claim 7, wherein said adjustable assembly comprises a lower guide roller positioned generally below said guide roller, said lower guide roller being arranged to guide a lower run of said single continuous conveyor belt between said first and second conveyor sections.

9. The conveyor unit of claim 7, wherein said second belted conveyor section is positionable at a decline relative to said first belted conveyor section.

10. The conveyor unit of claim 1, wherein said adjustable assembly comprises a pair of adjustable connectors adjustably mounted to opposite sidewalls of said first and second conveyor sections.

11. The conveyor unit of claim 10, wherein each of said adjustable connectors comprises a first connecting link extending from one end of said connector and a second connecting link extending from an opposite end of said connector, said first and second connecting links being securable to said sidewalls of respective ones of said first and second belted conveyor sections to connect said first and second belted conveyor sections to said connectors, said first and second connecting links being pivotable about said pivot axis relative to said connectors to align said connecting links with said sidewalls of said first and second belted conveyor sections throughout said range of pivotal adjustment of said adjustable assembly.

12. The conveyor unit of claim 11, wherein at least one of said connecting links is adjustably securable to said sidewalls to accommodate angular adjustment of said belted conveyor sections.

13. The conveyor unit of claim 11, wherein said first and second connecting links comprise first and second upper connecting links and first and second lower connecting links, said first and second upper connecting links being securable to upper portions of said respective sidewalls and said first and second lower connecting links being securable to lower portions of said respective sidewalls.

14. The conveyor unit of claim 13, wherein at least one of said first and second lower connecting links is adjustably securable to said lower portions of said respective sidewalls to accommodate angular adjustment of said sidewalls about said pivot axis.

15. The conveyor unit of claim 1, wherein at least one of said first and second belted conveyor sections includes a driven roller that is rotatably drivable to drive a respective one of said first and second continuous belts.

16. The conveyor unit of claim 15, wherein said driven roller comprises a motorized roller having an internal motor that is operable to rotatably drive a roller portion of said roller relative to a shaft portion of said roller.

17. An adjustable assembly for connecting adjacent belted conveyor sections, the adjacent belted conveyor sections being angularly positionable relative to one another, said adjustable assembly comprising:
  a pair of adjustable connectors and a roller mounted to and positioned between said pair of adjustable connectors, each of said adjustable connectors comprising:
   a body positionable between the opposed ends of the respective sidewalls of the adjacent belted conveyor sections, said body including a shaft receiving aperture for receiving a shaft end of said roller; and
   a first connecting link extending from one end of said body and a second connecting link extending from an opposite end of said body, said first and second connecting links being pivotable about a pivot axis relative to said body to align with the respective sidewalls of the respective adjacent belted conveyor sections, said pivot axis being generally coaxial with said shaft receiving aperture, said first and second connecting links being securable to the respective belted conveyor sections to connect the belted conveyor sections to said body.

18. The adjustable assembly of claim 17, wherein said body of said connectors are configured to generally align said roller with the rollers of the adjacent belted conveyor sections throughout a range of angular adjustment of said adjustable assembly when said first and second connecting links are secured to the respective belted conveyor sections.

19. The adjustable assembly of claim 18, wherein said range of angular adjustment comprises pivoting said adjustable assembly to align with a belted conveyor section that is between at least approximately five degrees of an incline relative to the other belted conveyor section and at least approximately five degrees of a decline relative to the other belted conveyor section.

20. The adjustable assembly of claim 18, wherein said adjustable assembly is configured to position first and second conveyor sections so that said roller comprises a roller for a continuous belt of a downstream belted conveyor section and is aligned with the rollers of an upstream belted conveyor section such that an article on the upstream belted conveyor section does not substantially engage said roller of said adjustable assembly as the article is conveyed from the upstream belted conveyor section to the downstream belted conveyor section.

21. The adjustable assembly of claim 17, wherein said first and second connecting links comprise first and second upper connecting links positioned at an upper portion of said body and configured to secure to upper portions of the respective belted conveyor sections.

22. The adjustable assembly of claim 21 including first and second lower connecting links at opposite ends of said body and pivotable about a second axis relative to said body to align with lower portions of the respective belted conveyor sections.

23. The adjustable assembly of claim 17, wherein said connecting links are adjustably securable to the respective belted conveyor sections to accommodate angular adjustment of said connecting links about said pivot axis and a corresponding angular adjustment of the belted conveyor sections.

24. The adjustable assembly of claim 17, wherein said adjustable assembly is positionable between a generally horizontal conveyor section and an inclined conveyor section, a continuous belt of the inclined conveyor section being reeved around said roller at said shaft receiving aperture, the inclined conveyor section being downstream of the generally horizontal conveyor section.

25. The adjustable assembly of claim 17, wherein said adjustable assembly is positionable between a declined conveyor section and a generally horizontal conveyor section, a continuous belt of the generally horizontal conveyor being reeved around said roller at said shaft receiving aperture, the generally horizontal conveyor being downstream of the declined conveyor.

26. The adjustable assembly of claim 17, wherein said adjustable assembly is positionable between a generally horizontal conveyor section and a declined conveyor section, the declined conveyor section being downstream from the generally horizontal conveyor section, whereby a single continuous belt is reeved around the rollers of both sections and over said roller at said shaft receiving aperture.

27. The adjustable assembly of claim 26, wherein said body of each of said adjustable connectors includes a second shaft receiving aperture positioned generally below said first shaft receiving aperture, said second shaft receiving apertures receiving an axle shaft of a guide roller for guiding a lower run of the continuous belt along and between the belted conveyor sections.

28. The adjustable assembly of claim 17, wherein said roller comprises a driven roller operable to drive the continuous belt of at least one of the conveyor sections.

29. A conveyor unit comprising:
  a first belted conveyor section having a first continuous belt reeved over and around at least two rollers;
  a second belted conveyor section having a second continuous belt reeved over and around at least two rollers; and
  an adjustable assembly configured to accommodate angular adjustment between said first and second belted conveyor sections, said adjustable assembly positioning said first and second belted conveyor sections so that one of said rollers of said second belted conveyor section is aligned with said at least two rollers of said first belted conveyor section in a direction of conveyance of said conveyor from said first belted conveyor section to said second belted conveyor section such that an article on said first belt of said first belted conveyor section does not substantially engage said aligned roller of said second belted conveyor section as the article is moved from said first belt of said first belted conveyor section onto said second belt of said second belted conveyor section.

30. The conveyor unit of claim 29, wherein said one of said rollers is aligned with said rollers of said first belted conveyor section throughout a range of angular adjustment of said adjustable assembly.

31. The conveyor unit of claim 29, wherein said second belted conveyor section is at an incline relative to said first belted conveyor section.

32. The conveyor unit of claim 29, wherein said first belted conveyor section is at a decline relative to said second belted conveyor section.

33. The conveyor unit of claim 29, wherein said adjustable assembly is configured to mount one of said rollers of said second belted conveyor section.

34. The conveyor unit of claim 29, wherein said adjustable assembly is pivotable about a pivot axis generally orthogonal to said direction of conveyance.

35. The conveyor unit of claim 34, wherein said adjustable assembly is configured to mount one of said rollers of said first and second belted conveyor sections generally along said pivot axis.

36. The conveyor unit of claim 35, wherein said adjustable assembly comprises a pair of angular connectors configured to attach to opposite sidewalls of said conveyor sections.

37. The conveyor unit of claim 36, wherein each of said angular connectors comprises a body portion that includes at least one mounting arm pivotally attached to said body portion and extending from each end of said body portion, said mounting arms being connectable to a respective one of said first and second belted conveyor sections.

38. The conveyor unit of claim 37, wherein said mounting arms are pivotable about said pivot axis to adjust said first and second belted conveyor sections relative to one another.

39. The conveyor unit of claim 38, wherein said mounting arms are adjustably connectable to the respective belted conveyor section to accommodate relative angular adjustment of said belted conveyor sections about said pivot axis.

40. The conveyor unit of claim 29, wherein at least one of said first and second belted conveyor sections includes a driven roller that is rotatably drivable to drive a respective one of said first and second continuous belts.

41. The conveyor unit of claim 40, wherein each of said first and second belted conveyor sections includes a driven roller that is rotatably drivable to drive a respective one of said first and second continuous belts, said driven rollers of said first and second belted conveyor sections being operable at different speeds.

42. The conveyor unit of claim 41, wherein said driven roller comprises a motorized roller having an internal motor that is operable to rotatably drive a roller portion of said roller relative to a shaft portion of said roller.

* * * * *